Jan. 19, 1932.     R. L. MORTON     1,841,839
LIQUID DELIVERY APPARATUS
Filed May 9, 1929
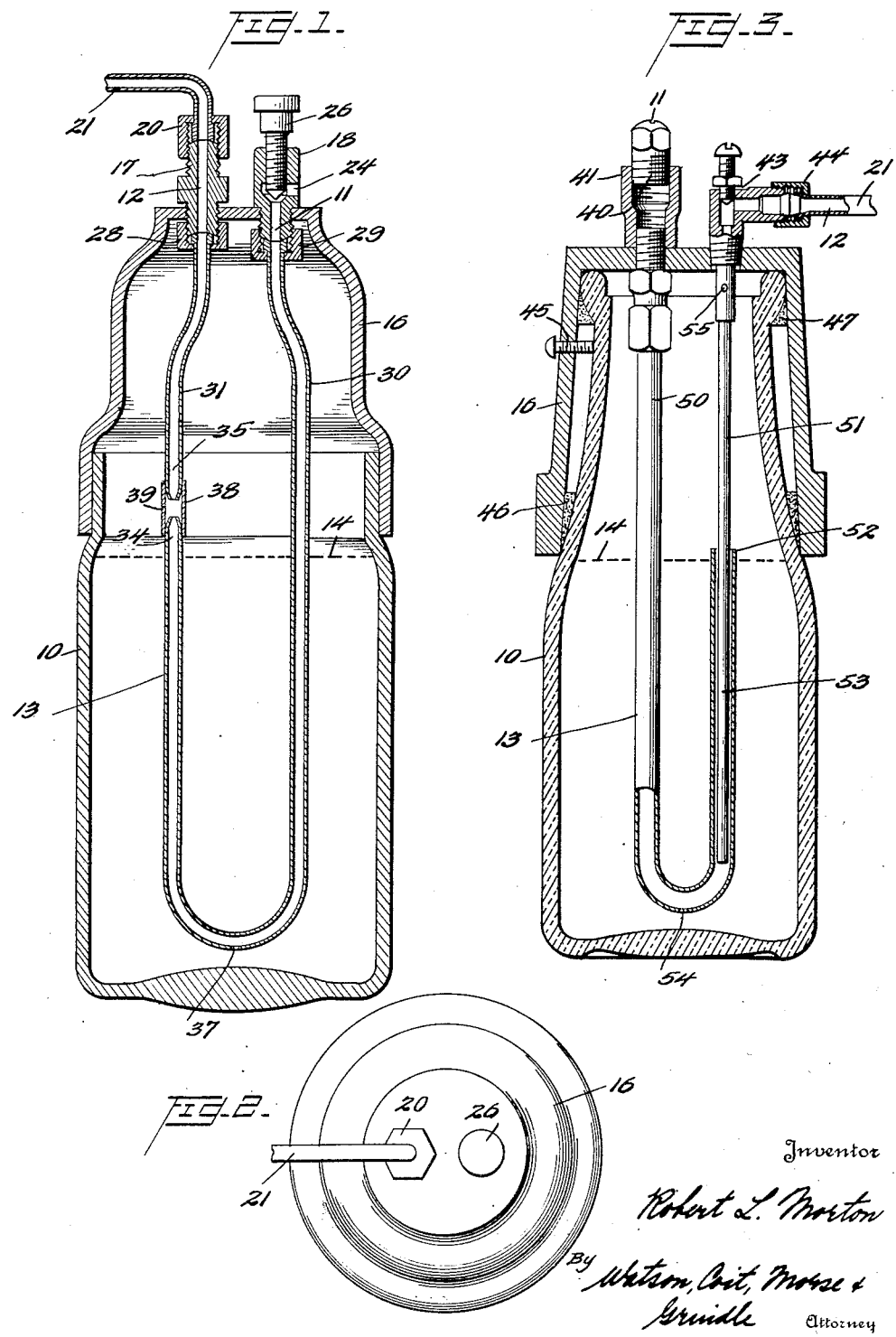
Inventor
Robert L. Morton
By Watson, Coit, Morse & Grindle
Attorney Patented Jan. 19, 1932

1,841,839

UNITED STATES PATENT OFFICE

ROBERT L. MORTON, OF LONG BEACH, CALIFORNIA

LIQUID DELIVERY APPARATUS

Application filed May 9, 1929. Serial No. 361,807.

This invention relates to liquid delivery apparatus and to the use of such apparatus for the lubrication of internal combustion engines.

The lubricant commonly used in the crank case of an internal combustion engine is altogether unsuitable for the lubrication of the moving parts associated with the combustion chamber of the engine. When subjected to the high temperatures prevailing in the combustion chamber, the crank case oil burns rapidly and forms hard, dry carbon which collects on the walls of the combustion chamber, the cylinder heads and the valve faces and stems, and thereby reduces the efficiency of the motor and results in the sticking and burning of the valves. For this reason the modern internal combustion engine is ordinarily provided with efficient and closely fitting pistons and piston rings to prevent the passage of the oil from the crank case into the combustion chamber. As a result, the upper portions of the pistons and cylinders, and the inlet and exhaust valves, are insufficiently lubricated and excessive wear of the moving parts, scoring of the cylinders, and sticking of the valves occurs. For this reason the tight fitting rings defeat the very purpose for which they are designed.

It is an object of the present invention to overcome the defects arising from the efficient sealing of the combustion chamber from the crank case by supplying directly to the combustion chamber a lubricant capable of withstanding a high temperature and leaving little or no carbon residue when finally burned, and for providing an efficient liquid delivery device for this purpose which will function automatically and with a minimum amount of attention from the operator.

It is apparent that the need for lubrication of the moving parts associated with the combustion chamber is greatest when the engine is operating under a heavy load. and is consuming a large quantity of fuel, since the amount of heat developed in the combustion chamber is ordinarily proportional to the fuel consumption.

It is therefore a further object of the invention to provide a device of the character described which will deliver a maximum amount of lubricant to the combustion chamber when the throttle is opened and the pressure in the intake manifold is correspondingly increased and to retard the flow of lubricant as the throttle valve is closed and the intake pressure is decreased.

It is a further object of the present invention to provide a container for high temperature oil adapted to be connected to the intake manifold of an engine for automatically delivering the oil to the manifold by means of the suction effect produced thereby and at a rate inverse to the degree of vacuum in the manifold.

It is a further object of the present invention to provide a device which will operate to deliver oil at a rate varying from zero to a maximum and which will act over the range of pressures normally existing in the manifold, and to provide a means for regulating the amount of oil delivered in response to any given pressure in the manifold.

A further object of the invention is the provision of a device of this character which is simple and efficient in operation, and which is characterized by the ease with which it may be manufactured and installed.

Further objects and features of the invention will be apparent from the following description taken in connection with the accompanying drawings, in which:

Figure 1 is a sectional view of a preferred form of liquid delivery apparatus constructed in accordance with principles of the present invention;

Figure 2 is a plan view of the apparatus; and

Figure 3 is a sectional view of a slightly modified form of apparatus.

This application is a continuation in part of application, Serial No. 223,970, filed October 4, 1927.

Referring to Figure 1 of the drawings, it will be noted that the apparatus consists primarily of a sealed container 10, an inlet means 11 for admitting air to the container, an outlet means 12 adapted to be coupled to the intake manifold of an engine, and means indicated generally at 13 for connecting the inlet and outlet means, and extending below the surface 14 of the liquid, this connecting means being so constructed and arranged as to deliver liquid tó the outlet in an amount inverse to the suction produced in the outlet by the vacuum in the intake manifold. The specific embodiment of the invention disclosed in Figure 1 of the drawing will now be described.

In this form of the invention a cap 16 of any suitable form, and preferably supporting the inlet and outlet 11 and 12, is mounted on the container 10 so as to form therewith a sealed chamber. The inlet and outlet means preferably comprise elements 17 and 18 which are threaded into the cap 16, the element 17 being provided with a conventional coupling 20 by which an airtight connection may be made to the tube 21, leading to the intake manifold of the engine, and the element 18 being provided with an aperture 24 communicating with the exterior of the container. A manually operable control member 26 may be provided for regulating the amount of air passing through the aperture 24. The element 17 is provided with a coupling 28 and the element 18 with a similar coupling 29 to which the ends of the connecting means 13 may be secured.

The connecting means 13 preferably takes the form of a conduit or tube and, if desired, may be constructed in one piece. As shown in Figure 1 of the drawings, this connecting means may be more conveniently formed as two separate conduits, one conduit 30 being connected to the element 18 through the coupling 29, and the other conduit 31 being connected to the element 17 through the coupling 28. The conduit 30 is substantially U-shaped, extends below the surface of the liquid, and has the end 34 remote from the coupling 29 located above the surface of the liquid. The conduit 31 extends as at 35 to a point adjacent the end 34 of the conduit 30. An aperture 37 is provided in the conduit 30 below the surface 14 of the liquid and preferably adjacent the lowest point of the conduit.

It will be seen that the construction so far described constitutes in effect a single connecting means between the element 17 and 18, apertured beneath and above the surface of the liquid. To afford a more rigid construction, and to assist in securing positive and efficient operation of the device, the ends 34 and 35 of the conduits 30 and 31 respectively may be crimped as shown in Figure 1 of the drawings, to restrict the openings therein and may be connected by a member 38 having an aperture 39 therein communicating with the container above the surface of the liquid, although this construction is not essential to the proper functioning of the device.

The operation of the apparatus so far described is substantially as follows:

When the tube 21 is connected to the intake manifold of an engine, and the control member 26 is set in a position permitting the free entrance of air through the aperture 24 to the inlet 11, the engine is started and is operated with a wide open throttle corresponding to a heavy load. Under these conditions, air issues from the aperture 37 in the form of a constant stream of bubbles and flows upward through the oil, practically no oil being delivered through the tube 21 to the intake manifold. The control member 26 is now gradually moved to a position for retarding the flow of air through the aperture 24, and the stream of bubbles issuing through the aperture 37 gradually diminishes, and the amount of oil delivered through the tube 21 is correspondingly increased. When the entrance of air through the aperture 24 is sufficiently restricted by manipulation of the control element 26, the issuance of bubbles from the aperture 37 ceases altogether, and the maximum amount of oil which the apparatus is capable of delivering under the given conditions of throttle opening and load is introduced into the manifold. As the vacuum in the tube 21 is decreased by closing the engine throttle, and air bubbles again issue through the aperture 37 in a constantly increasing amount, the amount of oil delivered through the tube 21 correspondingly decreases. If the apparatus is adjusted properly, a setting of the engine throttle valve corresponding to no load operation results in the issuance of a steady stream of air bubbles through the aperture 37, and a reduction in the amount of oil delivered through the tube 21 to a minimum. It will therefore be appreciated that this apparatus operates to deliver oil at the greatest rate when the engine is laboring and the vacuum in the intake is low, and at the least rate when the engine is idling and the vacuum in the intake manifold is high. The operation of the device in the desired manner is probably based on the following theory, which has been developed as a result of observation during a test of the device under ordinary operating conditions:

When the suction applied to the tube 21 by the intake manifold is high, air enters the inlet 11 through the aperture 24, passes downwardly through the tube 30, issues through the aperture 37 and passes through the conduit 31 through the aperture 39, and the restricted conduit end 35, at a given rate. The issuance of bubbles of air through the aperture 37 effectively prevents the entrance of oil into the conduit 30, and no oil, or a minimum amount of oil, is supplied through the tube 21.

When the suction produced in the tube 21 by the action of the manifold is diminished, the stream of bubbles issuing from the aperture 37 likewise diminishes, and thereby permits the entrance of oil into the conduit 30, a portion of this oil passing up through the conduit end 34 and through the conduit 31, to the tube 21 and thence to the manifold. When the issuance of bubbles through the aperture 37 ceases altogether, a maximum amount of oil enters the conduit 30 and is accordingly delivered to the motor. The oil column in that leg of the conduit 30 which is connected to the element 18, is sufficiently high under conditions resulting in the application of a low degree of suction to the tube 21 to effectively prevent the air reaching the aperture 37. When this degree of suction is increased, the oil is drawn up on that side of the connecting means 13 adjacent the outlet, and the air may issue through the aperture 37. Presumably the air issues from this aperture instead of passing up through the further leg of the conduit 30 by reason of the viscosity of the oil and by reason of the fact that the conduit is small and the air bubbles substantially fill the conduit and would therefore lift the entire column of oil in the further leg of the conduit 30 in passing through that conduit and out through the conduit 31.

Referring now to Figure 3 of the drawings, in which an alternative arrangement is illustrated, it will be seen that the essential portions of the apparatus including the container 10, the inlet 11, the outlet 12, and the connecting means 13 are present. The control means 26 of Figure 1 is replaced in Figure 2 with a filling plug 40. This plug is preferably threaded into an element 41 which is rigidly secured to or is formed integrally with the cap 16 of the apparatus. A control device 43, in which the outlet 12 is formed, is screw-threaded into the cap 16 and is provided with suitable means for permitting the regulation of the amount of air or oil passed through the outlet 12. This control device is connected by means of a suitable coupling 44 with the outlet tube 21 leading to the intake manifold of the engine.

In this form of the invention, the cap 16 is preferably secured in position on the container 10 by means of a threaded element 45 projecting through the cap and into contact with the container wall. The container is sealed as at 46 and 47 to prevent the leakage of air.

A conduit 50 is coupled to the inlet 11 and a conduit 51 is coupled to the outlet 12 in any suitable manner. The conduit 50 extends downwardly beneath the surface of the oil and has the end 52 remote from the inlet disposed above the surface of the oil. The conduit 51 is telescoped into the open end 52 of the conduit 50 as shown at 53. An aperture 54 is provided in the conduit 50 adjacent the lower end therof and beneath the surface of the oil. A second aperture 55 is provided in the conduit 51 above the surface of the oil, this aperture corresponding to the aperture 39 in the form of the invention shown in Figure 1.

The mode of operation of the construction shown in Figure 3 is identical with that shown in Figure 1, as will be obvious from a comparison of the two figures. The principal distinction between the two constructional forms is in the disposition of the control means adjacent the outlet 12 in the form shown in Figure 3, and adjacent the inlet 11 in the form shown in Figure 1.

It will thus be seen that the present invention contemplates the provision of an efficient apparatus for lubricating the pistons and valves associated with the combustion chamber of an internal combustion engine, and is characterized by simplicity of construction and the absence of any moving parts.

After the initial adjustment of the apparatus to deliver oil in varying amounts corresponding to the usual range of pressures existing in the intake manifold, the operation is continued automatically, and requires no further attention save the occasional replacement of oil in the container.

While specific forms of the invention have been described for the purpose of illustrating the application of the principles of the invention, it will be appreciated that various changes may be made in the constructional details of the component parts of the apparatus and their relationship in the completed device, and that such further alterations and changes are contemplated as fall within the spirit and scope of the present invention as defined in the appended claims.

Having thus described the invention, what is claimed as new and desired to be secured by Letters Patent is:

1. In an oiling mechanism for internal combustion engines, the combination with an airtight container for oil having an inlet for admitting air, and an outlet adapted for connection with the intake manifold of an internal combustion engine, of means connecting said inlet and outlet and extending beneath the surface of the oil for delivering oil through said outlet in an amount varying from zero to a maximum and increasing with increase in pressure in the intake manifold, and means for adjusting said first mentioned means to coordinate the delivery of oil in amounts from zero to a maximum to the range of pressures ordinarily existing in the intake manfold.

2. In an oiling mechanism for internal combustion engines, the combination with a container for oil having an inlet for admitting air, and an outlet adapted for connection with the intake manifold of an internal combustion engine, of a conduit for connecting said inlet and outlet and extending beneath the surface of the oil for delivering oil through said outlet, said conduit being provided with apertures therein beneath and above the surface of the oil.

3. In lubricating mechanism for internal combustion engines, the combination with an airtight receptacle adapted to be partially filled with liquid lubricant, leaving an air chamber in the upper portion thereof, of a conduit extending beneath the level of the liquid in the receptacle, one end of said conduit having restricted communication with the exterior of the receptacle, the other end of said conduit adapted for connection with the intake manifold of an engine, said conduit being apertured beneath the surface of the liquid and communicating with said air chamber adjacent the second mentioned end thereof.

4. In lubricating mechanism for internal combustion engines, the combination with an airtight receptacle adapted to be partially filled with liquid lubricant, leaving an air chamber in the upper portion thereof, of a conduit extending into and out of said receptacle, said conduit being formed in two sections, one of said sections having one end in communication with the exterior of the receptacle, its other end above the level of the liquid, and its intermediate portion extending into the liquid and provided with an aperture therein, the other of said sections having one end loosely telescoped within said first section and the other end thereof adapted for connection with the intake manifold of an engine.

5. In an oiling mechanism for internal combustion engines, the combination with a container for oil having an inlet for admitting air, and an outlet adapted for connection with the intake manifold of an internal combustion engine, of a conduit for connecting said inlet and outlet and extending beneath the surface of the oil for delivering oil through said outlet, said conduit being provided with apertures therein beneath and above the surface of the oil, and means for regulating the flow of air through said inlet.

6. In an oiling mechanism for internal combustion engines, the combination with a container adapted to be partially filled with oil, having an inlet for admitting air, and an outlet adapted for connection with the intake manifold of an internal combustion engine, of a conduit for connecting said inlet and outlet and extending beneath the surface of the oil for delivering oil to said outlet, said conduit having a restricted aperture at its lowest point and a second restricted aperture within the container and above the surface of the oil.

7. In an oiling mechanism for internal combustion engines, the combination with a sealed container adapted to be partially filled with oil, of an inlet conduit for admitting air into the container having a central apertured portion extending beneath the surface of the oil and having one end communicating with the exterior of the container and the other end in restricted communication with the interior of the container above the surface of the oil, and an outlet conduit having one end thereof adapted for connection to the intake manifold of an engine, and the other end extending in close proximity to the last mentioned end of the inlet conduit and having restricted communication with the interior of the container.

8. In an oiling mechanism for internal combustion engines, the combination with a sealed container adapted to be partially filled with oil, of an inlet conduit for admitting air into the container having a central apertured portion extending beneath the surface of the oil and having one end communicating with the exterior of the container and the other end in restricted communication with the interior of the container above the surface of the oil, and an outlet conduit having one end thereof adapted for connection to the intake manifold of an engine, and the other end extending in close proximity to the last mentioned end of the inlet conduit and having restricted communication with the interior of the container, and means for regulating the flow of air through said inlet conduit.

9. In an oiling mechanism for internal combustion engines, the combination with a sealed container adapted to be partially filled with oil, of an inlet conduit for admitting air into the container having its central portion extending beneath the surface of the oil and provided with an aperture therein, and having one open end communicating with the exterior of the container and the other end partially open and extending above the surface of the oil, an outlet conduit having one open end thereof adapted for connecting with the intake manifold of an internal combustion engine and the other end partially open and extending in close proximity to the partially open end of the inlet conduit, and means connecting the partially open ends of the inlet and outlet conduits and provided with an aperture communicating with the interior of the container above the surface of the oil.

10. In a lubricator of the character described, walls forming an oil receptacle having an outlet adapted for attachment to the intake of an engine, walls forming a passage leading from the lower part of said receptacle to said outlet, walls having an opening providing communication between the upper part of said receptacle and said outlet, and a valve for controlling the flow from said passage to said outlet.

11. In an oiling mechanism, the combination with a closed container constituting an air chamber and adapted to contain a body of oil, an inlet for admitting air to the container, comprising a pipe leading downwardly beneath the surface of the oil and thence upwardly therefrom, a conduit connected to intake manifold of an internal combustion engine and operatively connected to said pipe, said pipe having an aperture beneath the surface of the oil, there being a passage between said outlet and said air chamber.

12. In an oiling mechanism, the combination with a closed container constituting an air chamber and adapted to contain a body of oil, an air inlet to said container and comprising a pipe leading beneath the surface of the oil and upwardly and outwardly therefrom, said pipe having an aperture beneath the surface of the oil, a conduit for connection with the intake manifold of an internal combustion engine and communicating with the air chamber and said pipe.

In testimony whereof I hereunto affix my signature.

ROBERT L. MORTON.